UNITED STATES PATENT OFFICE.

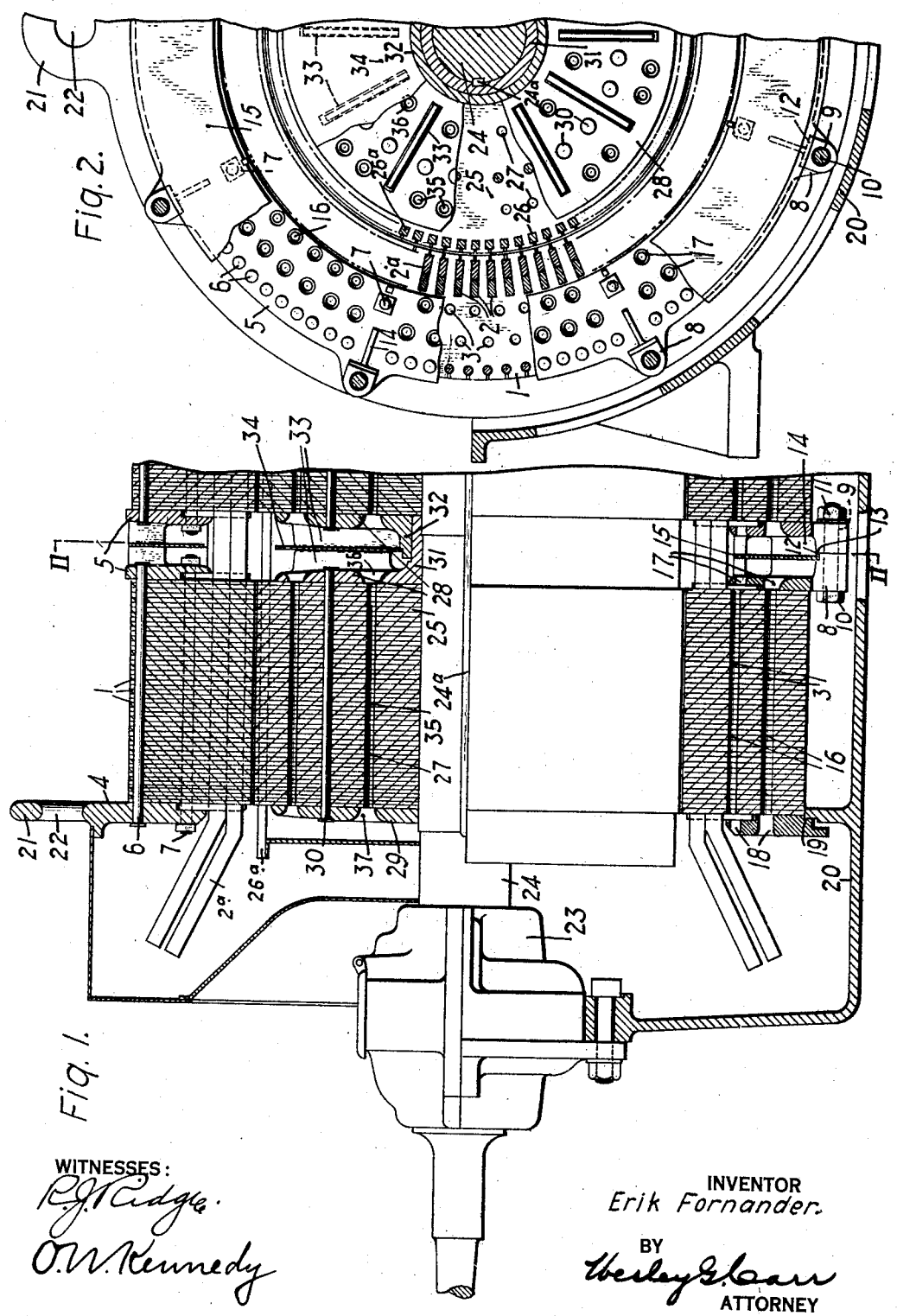

ERIK FORNANDER, OF WILKINSBURG, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,318,741. Specification of Letters Patent. Patented Oct. 14, 1919.

Application filed April 1, 1915. Serial No. 18,471.

*To all whom it may concern:*

Be it known that I, ERIK FORNANDER, a citizen of the United States, and a resident of Wilkinsburg, in the county of Allegheny and State of Pennsylvania, have invented a new and useful Improvement in Dynamo-Electric Machines, of which the following is a specification.

My invention relates to dynamo-electric machines, and it has particular reference to the magnetizable core members of dynamo-electric machines provided with longitudinal ventilating ducts and a central discharge duct.

In a copending application, Serial No. 15,800, filed March 20, 1915, by R. E. Hellmund and J. V. Dobson and assigned to the Westinghouse Electric & Manufacturing Company, is described a system of ventilation for dynamo-electric machines in which the cooling medium enters the machine at each end and is expelled from a central duct. In order to apply such a system, the magnetizable core members are built up in separate sections and are secured together in spaced relation by suitable means to form a substantially unitary structure.

The object of my invention is to provide a simple and convenient arrangement of parts by means of which the several core members may be spaced apart and maintained in proper coaxial alinement.

In the accompanying drawing, Figure 1 is a longitudinal sectional view of a dynamo-electric machine embodying my invention, and Fig. 2 is a sectional view along the line 2—2 of Fig. 1.

A plurality of annular sheet-metal punchings 1 provided with a plurality of radial slots 2 and a plurality of openings 3, as best shown in Fig. 2, may be assembled between annular end plates 4 and 5. The punchings 1 are secured together, between the end plates 4 and 5, by means of rivets 6 and through-bolts 7. The end plate 5 is provided, along its outer periphery, with a plurality of regularly spaced lugs 8 provided with openings 9. Two similar groups of punchings 1 are assembled between the end plates and placed in side-by-side relation and are secured together by means of bolts 10 and nuts 11 to form a substantially unitary structure. The lugs 8, carried by one of the two end plates 5, are formed with curved grooves 12 so that corresponding projections 13 on the other end plate will serve to maintain the two half sections in alinement. The end plates 5 are further provided with a plurality of integral radial ribs 14 which are located adjacent to the lugs 8. The ribs 14 are somewhat shorter than the lugs 8 and, when the two half portions of the core are assembled, as described above, the corresponding sets of ribs 14 are adapted to maintain an annular plate member 15 between them in a position substantially half-way between the end plates 5. The alined openings 3 of the assembled punchings 1 form a plurality of longitudinal ducts 16 which open into the central duct through corresponding openings 17 provided in the end plates 5. The end plates 4 are provided with similar openings 18.

The end plates 4 are further provided with grooves 19 by means of which the assembled core structure may be supported on a suitable base member 20. The end plates 4 are also provided with upwardly-extending portions 21 having openings 22 adapted to receive the hook of a suitable hoisting means. The base member 20 further serves as a support for suitable bearings 23 which are adapted to receive a shaft 24 and to support it concentrically with respect to the annular stationary core member.

Annular sheet-metal punchings 25, provided with a plurality of peripheral slots 26 and with a plurality of openings 27, are assembled between end plates 28 and 29 and are secured thereto by means of rivets 30. The end plate 28 of one of two similar groups of assembled punchings 25 is provided with a hub the inner diameter of which is substantially equal to that of the shaft 24. The hub 31 is of such length as to be substantially equal to the distance between the half portions of the assembled stator punchings 1. The other end plate 28 is provided with a hub portion 32 the inner diameter of which is substantially equal to the outer diameter of the hub 31. The outer and inner cylindrical surfaces of the hub portions 31 and 32, respectively are so machined that a close pressed fit may be obtained between the two surfaces, thus forming a substantially unitary structure of two similar groups of rotor punchings 25, which may be pressed on the shaft 24 and secured by means of a key 24ª. In like manner, the pressed fit renders the two end members and therefore the two groups of punchings readily separable for purposes of repair. The end plates 28 are provided with a plurality of integral radial webs 33 which are adapted to maintain an annular plate member 34 between them in correct alinement with the plate member 15. The alined openings 27 of the assembled punchings 25 form a plurality of longitudinal ducts 35 which open into the central duct through openings 36 provided in the end plates 28. The end plates 29 are provided with similar openings 37. The assembled sections of the stator and rotor cores are provided with suitable windings 2ª and 26ª that are carried in the peripheral slots 2 and 26, respectively.

It is apparent from the foregoing that a system of ventilation in which the cooling medium enters the openings 18 and 37 at either end of the machine, passes through the ducts 16 and 35 and discharges into the central ducts, may be readily applied to a machine constructed as described above. In such a system of ventilation, the plates 15 and 34 serve as baffles to prevent the currents of the cooling medium from opposite sides of the central ducts from interfering with each other, and the open spaces between the lugs 8 permit the discharge of the cooling medium into the surrounding atmosphere. It will also be apparent that when the separate units of the stator and rotor core members have been completely assembled with their respective windings and mounted upon the frame member and shaft, respectively, they will be properly spaced apart and maintained in coaxial alinement by the coacting portions of the end plates.

While I have shown my invention in a simple and preferred form, it is not so limited but is susceptible of such changes and modifications as come within the scope of the appended claims.

I claim as my invention:

1. A core structure for dynamo-electric machines comprising a plurality of built-up magnetizable portions and separable end members disposed in side-by-side relation, adjacent end members being provided with spaced peripheral projections to space apart the said built-up portions and to maintain them in coaxial alinement.

2. The combination with a core structure for dynamo-electric machines comprising a plurality of built-up annular magnetizable portions and end plates disposed in side-by-side relation, adjacent end plates being provided with projections to space apart the said portions and a plurality of ribs, of an annular plate member supported between the said portions by said ribs.

3. The combination with a core structure for dynamo-electric machines comprising a plurality of built-up magnetizable portions and end members disposed in side-by-side relation and provided with longitudinal ducts, adjacent end members being provided with oppositely-disposed projections to space apart the said built-up portions and a plurality of radial ribs, of an annular plate member located between said portions and supported in alinement with said ducts by said ribs.

4. A core structure for dynamo-electric machines comprising a plurality of built-up magnetizable portions and end members disposed in side-by-side relation, adjacent end members being provided with spaced peripheral projections having engaging surfaces for spacing apart the said built-up portions and for maintaining the said built-up portions in coaxial alinement.

5. A core structure for dynamo-electric machines comprising a plurality of annular built-up magetizable portions and a plurality of end members disposed in side-by-side relation, adjacent end members being provided with spaced peripheral portions projecting beyond the periphery of said built-up portions and means coacting therewith to secure said built-up portions together.

6. A core structure for dynamo-electric machines comprising a plurality of annular built-up magnetizable portions and a plurality of end members disposed in side-by-side relation, adjacent end members being provided with spaced peripheral projections having corresponding recessed and projecting portions for maintaining said built-up portions in coaxial alinement.

7. A core structure for dynamo-electric machines comprising a plurality of annular built-up magnetizable portions and a plurality of end members disposed in side-by-side relation, adjacent end members being provided with spaced peripheral projections having corresponding recessed and projecting portions for maintaining said built-up portions in coaxial alinement, and members coacting with said projections for securing said built-up portions together in spaced relation.

In testimony whereof, I have hereunto subscribed my name this 29th day of March, 1915.

ERIK FORNANDER.

Copies of this patent may be obtained for five cents each, by addressing the "Commissioner of Patents, Washington, D. C."